(12) United States Patent
Aoki et al.

(10) Patent No.: US 10,648,948 B2
(45) Date of Patent: May 12, 2020

(54) METHOD FOR DIAGNOSING PERFORMANCE DEGRADATION OF MACHINE ELEMENT, AND SYSTEM FOR SAME

(71) Applicant: MITSUBISHI HEAVY INDUSTRIES, LTD., Tokyo (JP)

(72) Inventors: Shoichi Aoki, Tokyo (JP); Hiroshi Ishibuchi, Tokyo (JP); Takafumi Yoshida, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/079,807

(22) PCT Filed: Jan. 31, 2017

(86) PCT No.: PCT/JP2017/003435
§ 371 (c)(1),
(2) Date: Aug. 24, 2018

(87) PCT Pub. No.: WO2017/150049
PCT Pub. Date: Sep. 8, 2017

(65) Prior Publication Data
US 2019/0049413 A1    Feb. 14, 2019

(30) Foreign Application Priority Data
Feb. 29, 2016    (JP) .................. 2016-038050

(51) Int. Cl.
*G01N 29/14*    (2006.01)
*G01N 29/44*    (2006.01)
(Continued)

(52) U.S. Cl.
CPC ........... *G01N 29/14* (2013.01); *G01N 29/043* (2013.01); *G01N 29/44* (2013.01);
(Continued)

(58) Field of Classification Search
CPC ................. G01N 29/14; G01N 29/44; G01N 2291/0289; G01N 2291/0258;
(Continued)

(56) References Cited

U.S. PATENT DOCUMENTS

2013/0006540 A1* 1/2013 Sakaguchi ............. G01H 1/003
  702/34
2014/0007657 A1* 1/2014 Matsubara ............ G01M 13/04
  73/53.05

FOREIGN PATENT DOCUMENTS

JP    2012-181168 A    9/2012
JP    2015-042867 A    3/2015

* cited by examiner

Primary Examiner — David Z Huang
(74) Attorney, Agent, or Firm — Manabu Kanesaka; Kenneth Berner; Benjamin Hauptman

(57) ABSTRACT

A system for diagnosing performance degradation of a machine element includes an AE sensor that generates an AE waveform signal; a vibration sensor that generates an acceleration signal; a signal processing unit including an AE signal processing system that performs predetermined signal processing on the plurality of AE waveform signals, a vibration signal processing system that performs predetermined signal processing on the acceleration signal, and a switching parameter generating section that generates a predetermined numeric parameter to switch a measuring mode from the AE method to the vibration method; and controlling unit that selects a result of the processing in performed by the AE signal processing system at the initial stage and selects, after the numeric parameter successively turns from increasing to decreasing, a result of the processing by the vibration signal processing system.

16 Claims, 9 Drawing Sheets

(51) Int. Cl.
  *G01N 29/04* (2006.01)
  *G05B 19/4065* (2006.01)
  *G05B 23/02* (2006.01)

(52) U.S. Cl.
  CPC ..... *G01N 29/4436* (2013.01); *G01N 29/4454* (2013.01); *G05B 19/4065* (2013.01); *G01N 2291/0258* (2013.01); *G01N 2291/0289* (2013.01); *G05B 23/0235* (2013.01); *G05B 2219/50276* (2013.01)

(58) Field of Classification Search
  CPC ........... G01N 29/4454; G01N 29/4436; G01N 29/043; G05B 19/4065
  See application file for complete search history.

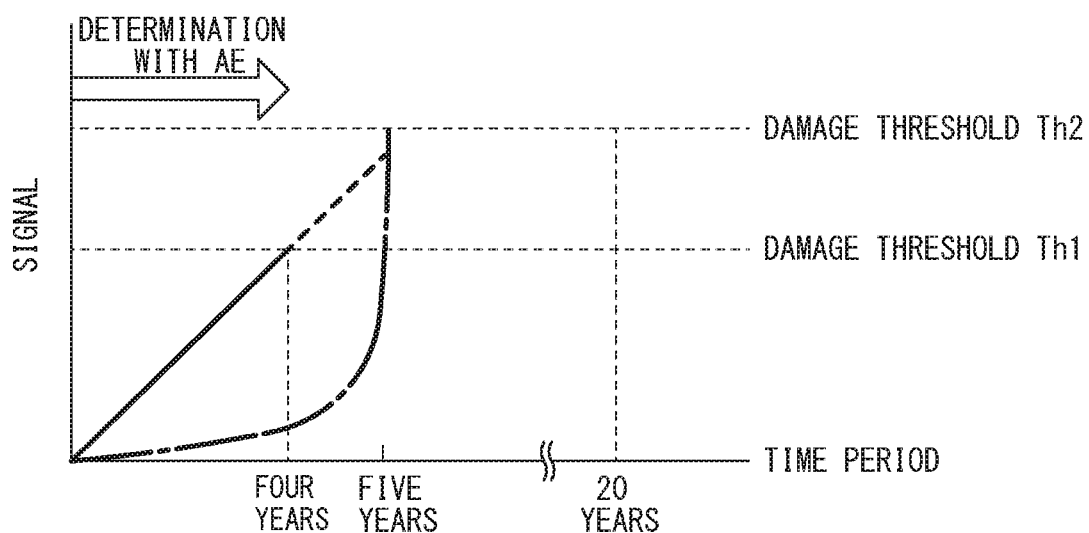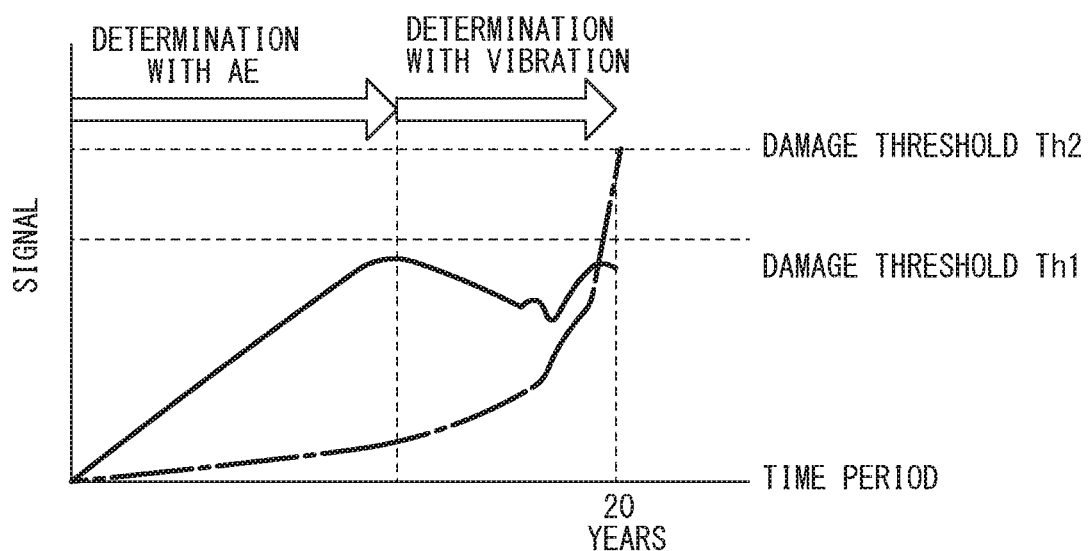

METHOD FOR DIAGNOSING PERFORMANCE DEGRADATION OF MACHINE ELEMENT, AND SYSTEM FOR SAME

RELATED APPLICATIONS

The present application is National Phase of International Application No. PCT/JP2017/003435 filed Jan. 31, 2017, and claims priority from Japanese Application No. 2016-038050, filed Feb. 29, 2016, the disclosure of which is hereby incorporated by reference herein in its entirety.

TECHNICAL FIELD

The present invention relates to a method for diagnosing performance degradation of a machine element and the system for the same, and is effectively applied to, for example, diagnosing performance degradation of a bearing of a wind turbine nacelle used in a wind turbine generator.

BACKGROUND TECHNIQUE

A wind turbine nacelle of a wind turbine generator uses a large-diameter bearing. Since this bearing is expensive and the spare thereof is rarely prepared in advance, another bearing is manufactured in the event of being damaged, which takes half a year until the delivery. Accordingly, it is important to appropriately diagnose the state of degradation of a large-diameter bearing, particularly the main bearing of a wind turbine nacelle of a wind turbine generator, which is expensive and takes time to be manufactured, as early as possible.

Traditional diagnosis of degradation of a bearing of a wind turbine nacelle has been accomplished mainly by the vibration method. The vibration method detects displacement at a measuring portion of a machine element (e.g., bearing) with a sensor such as a strain gauge, detects the acceleration of the measuring portion, and detects the degree of degradation on the basis of a force acting on the measuring portion (see Patent Literature 1, for example).

PRIOR ART REFERENCE

Patent Literature

[Patent Literature 1] Japanese Laid-open Patent Publication No. 2015-042867

SUMMARY OF INVENTION

Problems to be Solved by Invention

Although having been effectively used for a long time and being easily applicable from a technical aspect, the above vibration method has a difficulty in exactly detecting small degradation (e.g., crack and wear) at its initial stage. However, once a predetermined acceleration signal is detected, the vibration method can stably and exactly diagnose degradation in a desired manner because the amplitude of the signal linearly increases.

In the meantime, as another method for measurement that is applied to this type of degradation diagnosis, a method that uses an Acoustic Emission (AE) waveform signal based on an elastic wave generated by AE has been known. The AE method can surely detects degradation from its early stage However, in diagnosing degradation that has developed to some degree, the detection in the AE method may sometimes fail to exactly reflect the development of the degradation in the detection.

As a solution to the above, the art has cherished emergence of a method for diagnosis of degradation that is capable of exactly detecting a degree of degradation at its early stage over all the machine lifetime considered to be 20 years for a large-diameter bearing of a wind turbine nacelle.

The above degradation diagnosis is required for a machine element, such as a gear, for a large machine as well as a bearing of a wind turbine nacelle of a wind turbine generator.

With the foregoing technical problem in view, the object of the present invention is to provide a method for diagnosing performance degradation of a machine element and the system for the same that can exactly diagnose a state of generating cracks and wear inside a mechanical element such as a bearing during all the lifetime of the machine as early as possible.

Means to Solve the Problem

The first invention to attain the above object is:

1) A method for diagnosing performance degradation of a machine element that detects and diagnoses performance degradation of the machine element by detecting a state change occurring inside the machine element, the method comprising detecting the state change in an AE method using a plurality of AE waveform signals, chronologically occurring and each representing an elastic wave generated inside the machine element; and after a predetermined numeric parameter based on the plurality of AE waveform signals turns from increasing to decreasing as time passes, switching a measuring mode to detect the state change to a vibration method using an acceleration signal based on vibration occurring inside the machine element.

Since the above present invention can carry out predetermined degradation diagnosis in the AE method using AE waveform signals at the initial stage, so that cracks and wear of the machine element such as a bearing can be detected at an early stage. In addition, since lowering of the precision of the degradation diagnosis based on an AE waveform signal is exactly detected by a predetermined parameter based on the AE waveform signals turning from increasing to decreasing, the subsequent degradation diagnosis can be accomplished by applying the vibration method that uses an acceleration signal As a result, successive predetermined degradation diagnosis accompanied by development of degradation can be smoothly switched from the AE method to the vibration method at a proper timing so that precise degradation diagnosis can be achieved.

2) The present invention may use the numeric parameter that is based on an average amplitude of the plurality of AE waveform signals occurring in a unit time. In this case, the measuring mode can be easily and smoothly switched from the AE method to the vibration method through simple numeric processing.

3) The present invention may use the number of the plurality of AE waveform signals each forming an inclination angle coinciding with a reference value in a unit time as the numeric parameter; and use the inclination angle that is based on a fraction having a denominator representing a rise time between a time point when one of the plurality of AE waveform signals reaches a predetermined threshold and a time point when the AE waveform signal gives a maximum amplitude value and a numerator representing a maximum amplitude being an amplitude of the AE waveform signal at the time point when the AE waveform signal gives the maximum amplitude value. In this case, the number of particular reference values contained in the plurality of AE waveform signals occurring in a unit time can be used as the numeric parameter.

4) The present invention uses a first reference value reflecting a crack of the mechanical element and a second reference value reflecting wear of the machine element and being smaller than the first reference value as the reference value and also uses one of the number of the AE waveform signals each forming an inclination angle coinciding with the first reference value and the number of the AE waveform signals each forming an inclination angle coinciding with the second reference value as the numeric parameter to switch the measuring mode in this case, detecting separately from each other the number of the first reference values and the number of the second reference values makes it possible to altogether specify whether the degradation is degradation in which wear is dominant or degradation in which a crack is dominant.

5) The present invention uses a first reference value reflecting a crack of the mechanical element and a second reference value reflecting wear of the machine element and being smaller than the first reference value as the reference value, detects a total number of the number of the AE waveform signals each forming an inclination angle coinciding with the first reference value in a unit time and the number of the AE waveform signals each forming an inclination angle coinciding with the second reference value in the unit time, and uses the total number as the numeric parameter to switch the measuring mode. This case can separately specify degradation in which wear is dominant or degradation in which a crack is dominant and detects the respective degrees of the degradations at the same time. Since a large amount of information can be used for a switching timing for a measuring time, degradations can be precisely detected at an early stage.

6) In the present invention, the numeric parameter is the number of the plurality of AE waveform signals occurring in a unit time. Since a large amount of information can be used for a switching timing for a measuring time in this case, degradations can be precisely detected at an early stage.

7) When the detecting of the state change measures a plurality of the state changes of a plurality of measuring point of the machine element using a plurality of AE sensors, the present invention may generate a reference signal from a reference signal generator; previously detect a sensitive calibration amount that adjusts the reference signal detected by each of the plurality of AE sensors to have a same amplitude; and calibrate the plurality of AE waveform signals measured by the AE sensor using the sensitive calibration amount. This case can calibrate the dispersion of the sensitivities of the multiple AE sensors and therefore be qualified for highly precise degradation diagnosis.

8) When an installing position of each of the plurality of AE sensors is distant from an optimum measuring point for measuring the stage change, the present invention may obtain a damping amount of each of the plurality of AE waveform signals associated with a distance between the optimum measuring position and the installing position, wherein the damping amount is based on an amplitude characteristic representing an amplitude of the AE waveform signal with respect to the distance from the optimum measuring position of the AE sensor; and calibrate the AE waveform signal actually measured with the damping amount. In this case, even if the optimum measuring position is distant from the installing position of the AE sensor, which detects an AE waveform signal, due to a constraint such as the presence of an obstacle, the AE sensor can be made to be in an equivalent state of being moved to the optimum measuring position, so that highly precise measurement can be achieved.

The second embodiment is 9) a system for diagnosing performance degradation of a machine element including: an AE sensor that is mounted on the machine element serving as a diagnosis target and that generates an AE waveform signal representing an elastic wave occurring inside the machine element; a vibration sensor that is mounted on the machine element and that generates an acceleration signal based on a vibration wave occurring inside the machine element; a signal processing unit that includes an AE signal processing system that detects a state change occurring inside the machine element in an AE method using a plurality of the AE waveform signals chronologically occurring by receiving the plurality of AE waveform signals and performing predetermined signal processing on the plurality of AE waveform signals, a vibration signal processing system that detects the state change in a vibration method using the acceleration signal by receiving the acceleration signal and performing predetermined signal processing on the acceleration signal, and a switching parameter generating section that generates a predetermined numeric parameter to switch a measuring mode from the AE method to the vibration method; and controlling unit that selects a result of the processing in the AE method performed by the AE signal processing system at an initial stage and selects, after the numeric parameter turns from increasing to decreasing as time passes, a result of the processing in the vibration method.

Since the above present invention can carry out predetermined degradation diagnosis in the AE method using AE waveform signals at the initial stage, so that cracks and wear of the machine element such as a bearing can be detected at an early stage. In addition, since lowering of the precision of the degradation diagnosis based on an AE waveform signal is detected by a predetermined parameter based on the AE waveform signals turning from increasing to decreasing, the measuring mode is switched and the degradation diagnosis after the switching uses a vibration method using a vibration sensor that has preferable diagnosing precision at the latter stage of the degradation. As a result, successive predetermined degradation diagnosis accompanied by development of degradation can be smoothly switched from the AE method to the vibration method at a proper timing so that precise degradation diagnosis can be achieved.

10) The present invention may use the numeric parameter generated by the switching parameter generating section that is based on an average amplitude of the plurality of AE waveform signals occurring in a unit time. In this case, the measuring mode can be easily and smoothly switched from the AE method to the vibration method through simple numeric processing.

11) In the present invention, the numeric parameter generated by the switching parameter generating section is the number of the plurality of AE waveform signals each forming an inclination angle coinciding with a reference value in a unit time; and the inclination angle is a numeric value based on a fraction having a denominator representing a rise time between a time point when one of the plurality of AE waveform signals reaches a predetermined threshold and a time point when the AE waveform signal gives a maximum amplitude value and a numerator representing a maximum amplitude being an amplitude of the AE waveform signal at the time point when the AE waveform signal gives the maximum amplitude value. This case can detect degradation earlier than a case where a numeric parameter based on the maximum amplitude value of the AE waveform signals is used.

12) The present invention uses a first reference value reflecting a crack of the mechanical element and a second reference value reflecting wear of the machine element and being smaller than the first reference value as the reference value, and the AE signal processing system of the present invention detects the number of the AE waveform signals each forming an inclination angle coinciding with the first reference value in a unit time and the number of the AE waveform signals each forming an inclination angle coinciding with the second reference value in the unit time, and uses one of the number of the AE waveform signals each forming an inclination angle coinciding with the first reference value and the number of the AE waveform signals each forming an inclination angle coinciding with the second reference value as the numeric parameter to switch the measuring mode. In this case, detecting separately from each other the number of the first reference values and the number of the second reference values makes it possible to altogether detect whether the degradation is degradation in which wear is dominant or degradation in which a crack is dominant.

13) The present invention uses a first reference value reflecting a crack of the mechanical element and a second reference value reflecting wear of the machine element and being smaller than the first reference value as the reference value; and the AE signal processing system of the present invention detects a total number of the number of the AE waveform signals each forming an inclination angle coinciding with the first reference value in a unit time and the number of the AE waveform signals each forming an inclination angle coinciding with the second reference value in the unit time, and uses the total number as the numeric parameter to switch the measuring mode. This case can separately specify degradation in which wear is dominant or degradation in which a crack is dominant and detects the respective degrees of the degradations at the same time. The switching timing for a measuring time can further precisely be detected.

14) The numeric parameter of the present invention is the number of the plurality of AE waveform signals occurring in a unit time. Since a large amount of information can be used for a switching timing for a measuring time in this case, degradations can be precisely detected at the early stage.

15) In the present invention, a plurality of the AE sensors are distributed to a plurality of measuring points on the machine element; a plurality of the AE signal processing systems are provided one for each of the plurality of AE sensors; the controlling unit calibrates amplitudes of the plurality of AE waveform signals measured by the plurality of AE sensors using sensitive calibration amounts, the sensitive calibration amounts being detected previously such that amplitudes of a reference signal generated by a reference signal generator and detected by the plurality of AE sensors are the same, using a plurality of sensitive calibration amounts previously detected. This case can calibrate the dispersion of the sensitivities of the multiple AE sensors and therefore be qualified for highly precise degradation diagnosis.

16) In the present invention, the controlling unit obtains a damping amount of each of the plurality of AE waveform signals based on an amplitude characteristic of the AE waveform signal with respect to a distance from an optimum measuring position for measuring the state change by the AE sensor to the installing position, the amplitude characteristic being previously detected and calibrates an amplitude of the AE waveform signal actually measured with the damping amount. In this case, even if the optimum measuring position is distant from the installing position of the AE sensor, which actually detects an AE waveform signal, due to a constraint such as the presence of an obstacle, the AE sensor can be made to be in an equivalent state of being moved to the optimum measuring position, so that highly precise measurement can be achieved.

Effect of Invention

Using a predetermined numeric value based on the plurality of AE waveform signals as a parameter for switching a measuring mode, the present invention can appropriately and smoothly transfer from degradation diagnosis based on an AE waveform signal that can rapidly and exactly detect degradation at its early stage to degradation diagnosis based on the vibration method that can exactly detect degradation at its latter state leading to damage. Consequently, even for a case, such as a bearing of a wind turbine nacelle of a wind turbine generator, where it takes a long time to prepare a spare bearing and stoppage and repairing of the wind turbine generator accompanies a large cost, the present invention can provide a more appropriate result of diagnosis at an appropriate timing that can reduce the loss caused from preparing spare part and the damage as low as possible. Contriving a numeric parameter to be used for switching a measuring mode makes it possible to improve the quality of the diagnosis such as discriminating wear from a crack.

BRIEF DESCRIPTION OF DRAWING

FIGS. 3A and 3B are diagrams illustrating characteristics of numeric parameters based on the plurality of AE waveform signals and acceleration signals when an AE sensor and a vibration sensor detect degradation, FIG. 3A being a characteristic diagram representing a case of degradation in a short time, and FIG. 3B being a characteristic diagram of the entire operation lifetime (e.g., 20 years);

FIG. 5B is a schematic diagram illustrating an embodiment of the plurality of AE waveform signals occurring in a unit time in the experiment, and FIG. 5C being a characteristic diagram having an abscissa representing an amplitude (dB) and a coordinate representing the number of AE waveform signals occurring in a unit time;

EMBODIMENTS TO CARRY OUT INVENTION

Hereinafter, description will now be made in relation to an embodiment of the present invention with reference to the accompanying drawings.

The following embodiment is merely exemplary, and have no intention to exclude various modifications and applications of techniques not explicitly described therein. The respective structures of the following embodiment can be variously modified without departing from the scope of the invention, and may be selected, omitted, combined according to the requirement.

<System for Diagnosing Performance Degradation>

Figure 1:
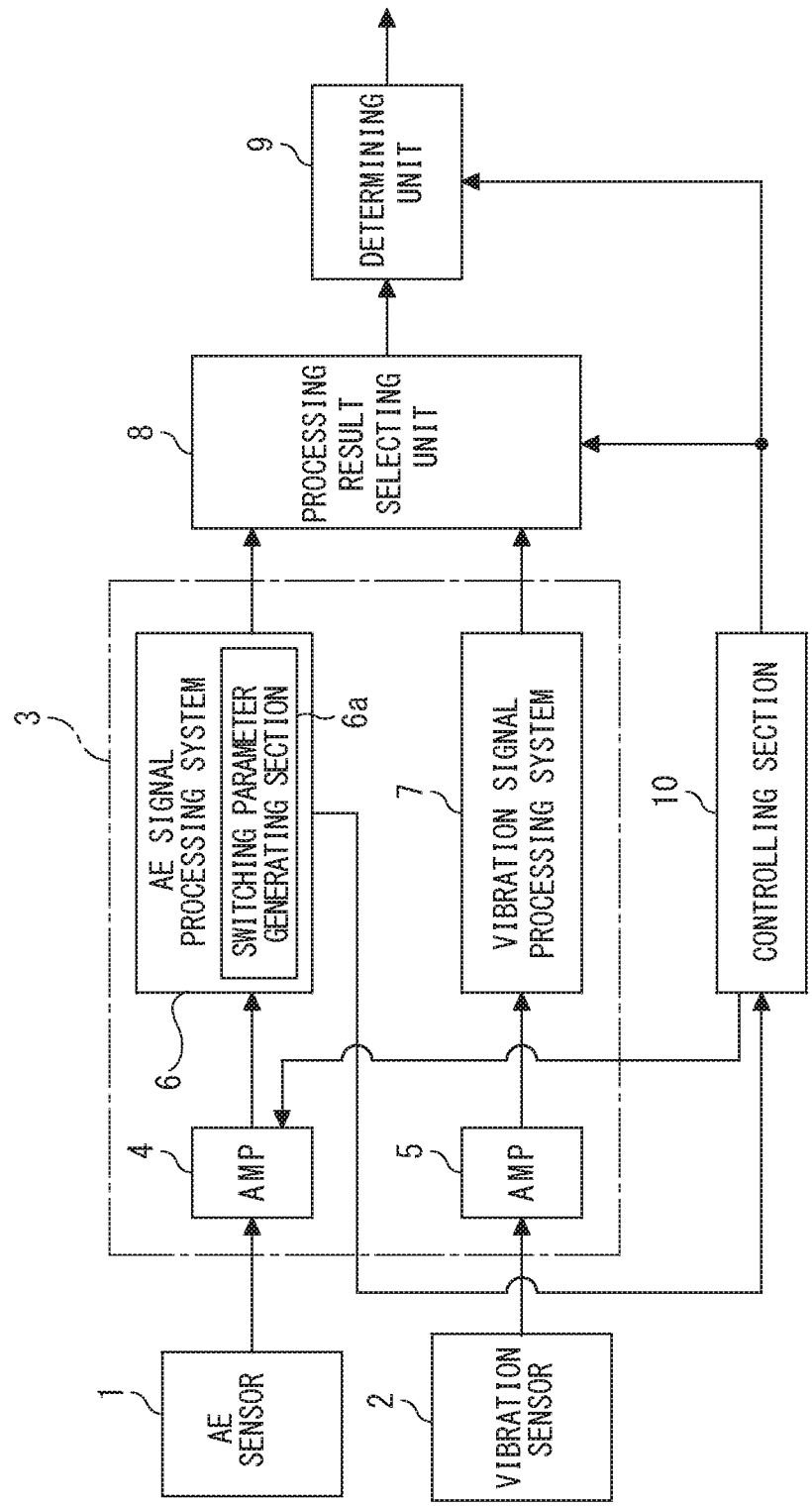
FIG. 1 is a block diagram showing a system for diagnosing performance degradation of a machine element according to an embodiment of the present invention.

FIG. 1 is a block diagram illustrating a system for diagnosing performance degradation of a machine element according to an embodiment of the present invention. As illustrated in FIG. 1, an AE sensor 1 detects an elastic wave occurring inside the machine element serving as a diagnosis target, the elastic wave being caused from degradation (e.g., cracks and wear, hereinafter the same is applied) of the machine element, and generates an AE waveform signal representing the detected elastic wave. Such a method for diagnosing degradation using an AE waveform signal is referred to as an AE method. A vibration sensor 2 detects a vibration wave occurring inside the machine element due to the degradation and generates an acceleration signal representing the detected vibration wave Such a method for diagnosing using an acceleration signal is referred to as a vibration method. A preferable example of a machine element here is a large-diameter bearing (e.g., $\Phi \fallingdotseq 2$ m) that rotatably supports the main shaft of the wind turbine of a wind turbine generator in a nacelle. Basically, any machine element can be the diagnosis target of the present embodiment, but the present embodiment is remarkably effective to a machine element for which a spare part is not prepared because of budgetary constrain or a machine element which takes a long time to be manufactured.

The signal processing unit 3 includes an AE signal processing system 6 that accomplishes the AE method by performing a predetermined process on an AE waveform signal input through an amplifier 4 and a vibration signal processing system 7 that accomplishes the diagnosis in the vibration method by performing a predetermined process on an acceleration signal input through an amplifier 5. Here, the AE signal processing system 6 analyzes AE waveform signals, and thereby detects a degree of successive degradation of the diagnosis target and transmits the result of the diagnosis representing the detected degree. The AE signal processing system 6 includes a switching parameter generating section 6a, which generates a predetermined numeric value based on the AE waveform signals as a numeric value parameter to switch the measuring mode from the AE method to the vibration method. The numeric parameter of this embodiment is satisfactorily based on an AE waveform signal and can be various values such as the maximum amplitude value of an AE waveform signal. Examples of the numeric parameter will be detailed below. The vibration signal processing system 7 analyzes an acceleration signal, and thereby detects a degree of successive degradation of the diagnosis target and transmits the result of the diagnosis representing the detected degree.

A controlling section 10 controls a selection function of a processing result selecting unit 8 such that the result of the diagnosis processed by the AE signal processing system 6 is selected at the initial stage and the result of the diagnosis processed by the vibration signal processing system 7 is selected at the latter stage when AE diagnosis target approaches the end of the operation life. More specifically, the information related to a predetermined numeric parameter generated by the switching parameter generating section 6a is input into the controlling section 10. For the above, the controlling section 10 controls the processing result selecting unit 8 such that the result of processing by the AE signal processing system 6 is selected at the initial stage of the diagnosing process and the result of processing by the vibration signal processing system 7 is selected after the numeric parameter representing a switching timing turns from increasing to decreasing as the passage of time.

A determining unit 9 determines whether a numeric value representing the degradation exceeds a predetermined damage threshold which numeric value is based on the result of diagnosis made by the AE signal processing system 6 or the vibration signal processing system 7 and inputs through the processing result selecting unit 8, and if the numeric value exceeds the damage threshold, transmits an alarm that indicates the excess.

<Procedure of Diagnosing Performance Degradation>

Figure 2:
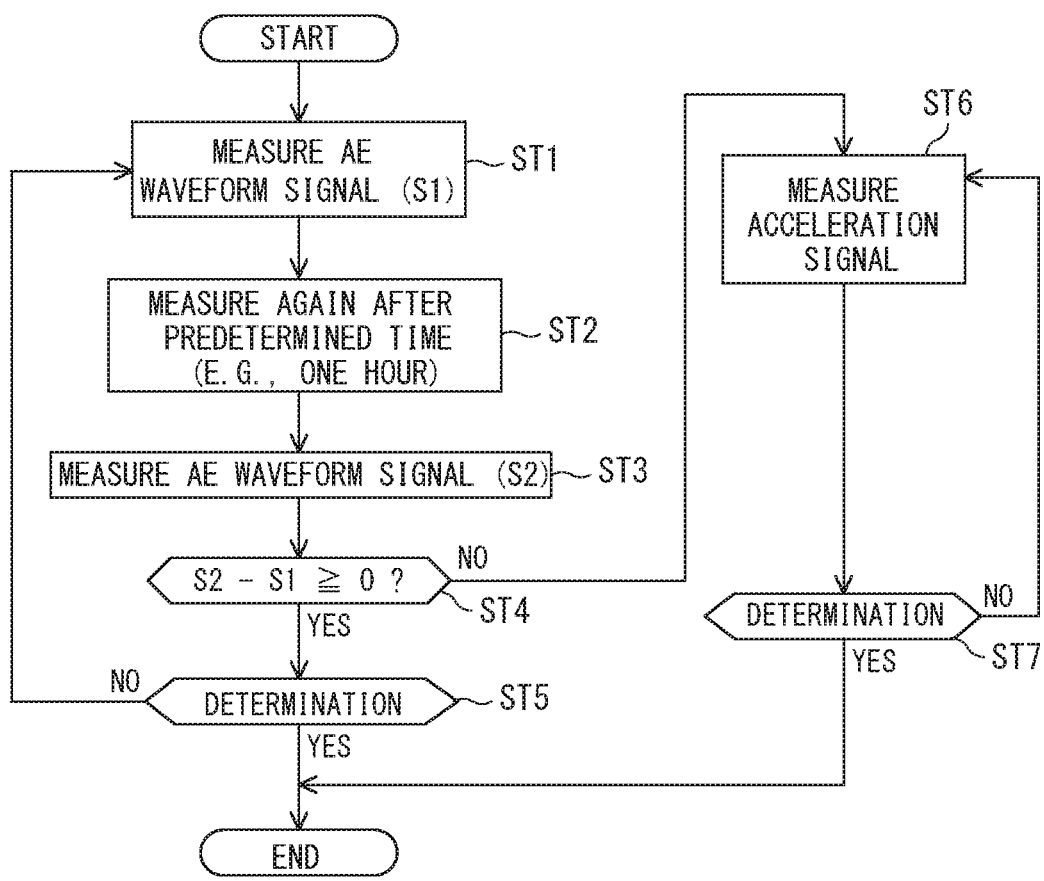
FIG. 2 is a flow diagram showing procedural steps of an embodiment according to the present invention.

FIG. 2 is a flow diagram showing successive procedural steps performed in the above system for diagnosing performance degradation. Description will now be made in relation to procedural step of processing a signal in the system for diagnosing performance degradation shown in FIG. 1 with reference to FIG. 2. The functional sites indicated by reference numbers 6, 7, 8, 9 and 10 described in FIG. 1 perform the following operations. After the start of measuring, an AE waveform signal is first measured and also a predetermined numeric parameter S1 is generated (see Step ST1). Then, after a predetermined time (e.g., one hour) from the predetermined process of Step ST1 (see Step ST2), an AE waveform signal is measured again and also a predetermined numeric parameter S2 is generated (see Step ST3). Then, the numeric parameter S1 detected in Step ST1 is subtracted from the numeric parameter S2 detected in Step ST3 (see Step ST4). When the result of the subtraction is positive or means to be equal (i.e., not negative), the predetermined numeric parameter is determined to be increasing or be constant, and determination is made whether or not the numeric parameter exceeds the predetermined damage threshold Th1 (see Step ST5). As a result of the determination of Step ST5, if the numeric parameter is equal to or less than the predetermined damage threshold Th1 predetermined for the AE method, the process of Steps ST1 to ST5 are repeated at regular intervals. On the other hand, as a result of the determination of Step ST5, if the numeric parameter exceeds than the predetermined damage threshold Th1, the development of degradation is determined to exceed a tolerant level of damage and an alarm indicating the excess is transmitted.

If the result of determination in Step ST4 is (S2−S1)<0, the predetermined numeric parameter turns from increasing to decreasing, which means the parameter is determined to pass a point of inflection, and then the measuring mode is switched. The switching of the measuring mode moves the degradation diagnosis into the vibration method using an acceleration signal. Specifically, the acceleration signal is measured (see Step ST6) and then determination of degradation is made on the basis of the acceleration signal (see step ST7). For example, the level of the acceleration signal is compared with a damage threshold TH2 predetermined for the vibration method As a result of the comparison, if the level of the acceleration signal is equal to or lower than the damage threshold Th2, the process of steps ST6 and ST7 are repeated at regular intervals. On the other hand, as a result of the determination in step ST7, if the level exceeds the damage threshold Th2, the development of degradation is determined to exceed a tolerant level of damage and an alarm indicating the excess is transmitted.

As described above, the present embodiment diagnoses degradation in the AE method at the initial stage of the degradation diagnosis, and after a predetermined numeric parameter has turned from increasing to decreasing, which means that lowering of the precision of the degradation diagnosis based on AE waveform signals is detected, the measuring mode switched to degradation diagnosis in the vibration method. With this configuration, the present embodiment can precisely and accurately accomplish degradation diagnosis on a machine element of the measuring target over the entire operation lifetime, dealing with continuous development of the degradation.

In further detail, FIGS. 3A and 3B are diagrams illustrating characteristics of numeric parameters based on AE waveform signals and acceleration signals when an AE sensor and a vibration sensor detect degradation. FIG. 3A is a characteristic diagram representing a case of degradation in a short time, and FIG. 3B is a characteristic diagram of the entire operation lifetime (e.g., 20 years). A numeric parameter (e.g., the amplitude of an AE waveform signal) based on the AE waveform signal in the AE method shown with the solid line in FIG. 3A linearly increases from the initial stage and takes about four years to reach a predetermined damage threshold Th1 in the example of the drawing. In contrast to the above, a numeric parameter (e.g., the amplitude of an acceleration signal) based on the acceleration signal in the vibration method shown with the one-dotted broken line in FIG. 3A extremely gently rises at the initial stage and takes five years to reach a predetermined damage threshold Th2 in the example of the drawing. This means that in the example of FIG. 3A, the AE method can detect a damage that requires the replacement of part one-year earlier than the vibration method detects a damage at its early stage. As a result, even when a considerable time is required to manufacture a replacement part, degradation diagnosis based on an AE waveform signal can detect a damage at an early stage and appropriately take measure such as manufacturing, replacing of the damaged machine element (e.g., bearing) with sufficient time. In contrast, the numeric parameter of the vibration method sharply increases in the vibration method, a replacement part is sometimes not successfully prepared in time to make it difficult to carry out appropriate maintenance if the replacement is squired.

In regard of a bearing, insufficient lubrication causes the bearing to abruptly degrade earlier than the original designed lifetime. The vibration method is unable to handle this case, but the AE method is preferably applied.

Here, a numeric parameter based on the AE waveform signal in the AE method shown with the solid line in FIG. 3B turns decreasing after the degradation develops to some extent so that a case where the numeric parameter does not exactly reflect development of the degradation, which is caused from the generating principle of AE, is generated. Specifically, the AE method detects a state where an elastic wave generated by a defect (e.g., non-metal enclosure) inside the material of the measuring target when, for example, a crack emerges, and the elastic wave propagates inside the measuring object with an AE waveform signal. However, since the AE waveform signal weakens at the middle and the latter stages of the operation lifetime of the measuring object as compared with the initial stage of measuring, the detection sensitivity may lower. For this reason, in cases where the measuring time period extends for a long time (e.g. 20 years) such as the entire operation lifetime of the diagnosis target, the detecting precision of the AE method lowers. The lowering characteristic of the numeric parameter shown with the solid line in FIG. 3B shows this characteristic.

After lowering of the measurement precision of the AE method when the predetermined numeric parameter turns from increasing to decreasing, the measurement uses a numeric parameter based on an acceleration signal of the vibration method shown by one-dotted line in FIG. 3B. In regard of a bearing, the numeric parameter based on an acceleration signal of the vibration characteristic has a characteristic of degradation curve approximately conforming to the designed operation lifetime under a state where the lubrication state is preferable In this case, the numeric parameter based on the AE waveform signal can be efficiently used as confirmation data for development of degradation at the initial stage from the start of damaging to the middle stage during which the vibration is not large very much.

<Numeric Parameter>

Figure 4A:
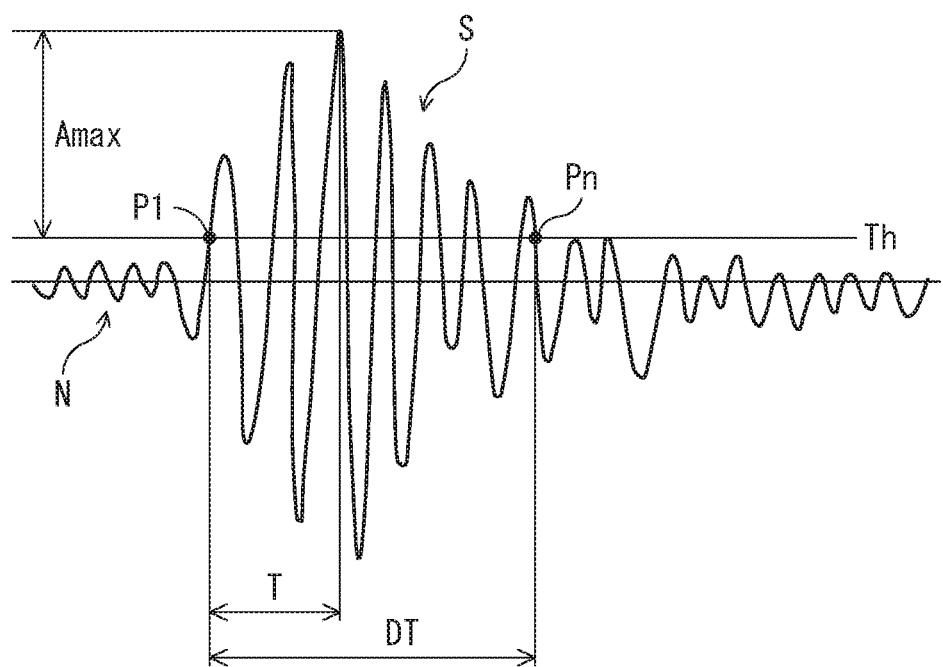
FIGS. 4A and 4B are diagrams explaining the principle of the AE method, FIG. 4A being a waveform diagram of an AE waveform signal, and FIG. 4B being a schematic diagram conceptually showing a hit of the AE method.
Figure 4B:
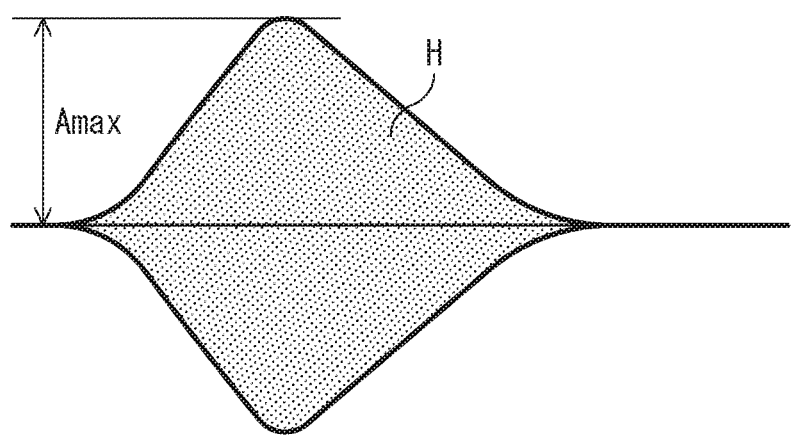

Here, description will now be made in relation to the numeric parameter that the AE method uses. FIG. 4A is a waveform diagram showing the waveform of an AE waveform signal that the AE method uses As illustrated in FIG. 4B, the AE method usually defines a single segment generated through envelope detection on an AE waveform signal S as a hit H, and analyzes and evaluates the state of a measuring target, using, for example, the number of hits, the maximum amplitude Amax, the number of counts (the number of intersections P of the threshold Th and the AE waveform signal S of FIG. 4A), or energy represented by the area of the hit H (area of the hatched portion of FIG. 4B). Accordingly, the above numeric values that have conventionally been used for evaluation can be basically used as a numeric parameter of the present embodiment. Here, description will be made in relation to 1) numeric parameter based on an amplitude of an AE waveform signal and 2) numeric parameter based on an inclination angle θ (to be detailed below). As shown in FIG. 4A, the threshold Th of the AE waveform signal S is set to be a level exceeding the background noise N to discriminate the signal component of the AE waveform signal S from the background noise N. The symbol T in the drawing indicates a rise time that the AE waveform signal S takes to reach the maximum amplitude Amax from the first intersection P1 of the AE waveform signal S, and the symbol DT represents a duration time that a single AE waveform signal S takes to reach the last intersection Pn from the first intersection P1.

1) Numeric Parameter based on Maximum Amplitude Amax:

This is a numeric parameter generated on the basis of an amplitude of each of multiple AE waveform signals S chronologically occurring. The maximum amplitude Amax may be used as the numeric parameter, but alternatively an average amplitude (dB) of multiple AE waveform signals S occurring in a unit time, which corresponds to the average value (dB) of the respective maximum amplitudes of the AE waveform signals S, may be used as the numeric parameter.

Figure 5A:
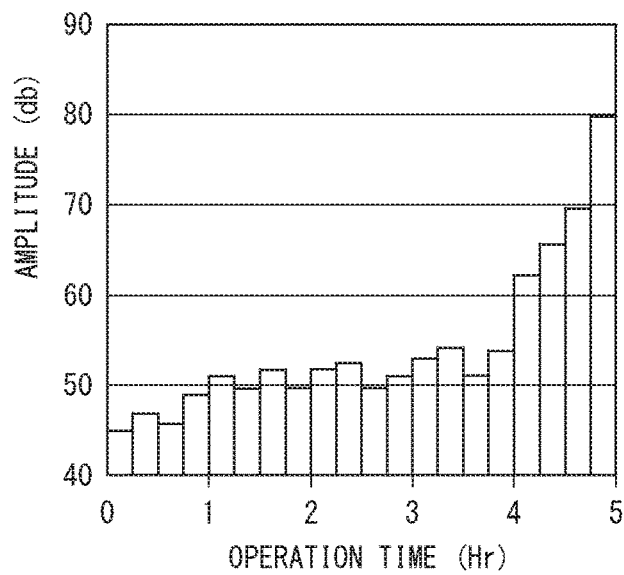
FIGS. 5A-5C are diagrams showing a result of an experiment of diagnosing degradation using an amplitude of the plurality of AE waveform signals, FIG. 5A being a characteristic diagram successively showing an average amplitude of multiple AE waveform signals occurring in a unit time.
Figure 5B:
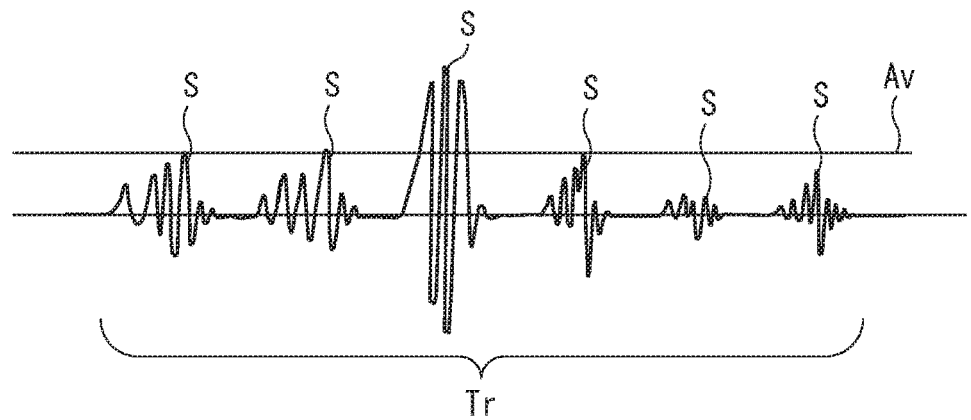
Figure 5C:
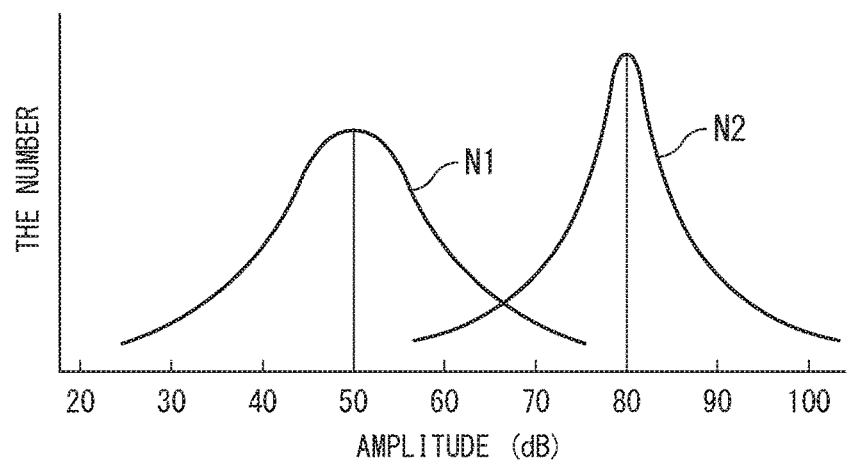

FIGS. 5A-5C are characteristic diagrams showing actually measured data obtained by inspecting a state of development of successive degradation in the AE method under a state where a crack is generated on a bearing of the measuring target and the bearing is actually operated. The bar graph of FIG. 5A shows the average amplitude (dB) of the multiple AE waveform signals S generated in a unit time. Further in detail, as illustrated in FIG. 5B, although a large number of AE waveform signals S chronologically occur, an average amplitude Av of the AE waveform signals S occurring in a unit time Tr is detected so that the amplitude of the AE waveform signals S can be used as the numeric parameter. The characteristic of FIG. 5A shows an example that the average amplitude Av of the AE waveform signals S occurring in a unit time Tr of one hour later is about 50 dB, which is changed to about 80 dB at five hours later. This means that, as shown in a characteristic drawing having an abscissa representing an amplitude and a coordinate representing the number of AE waveform signal generated in a unit time Tr of FIG. 5C, the relationship of one hour later establishes the normal distribution characteristic N1 and the relationship of five hours later establishes the normal distribution characteristic N2. In other words, the number of AE waveform signals S having an amplitude of 50 dB comes to be the maximum one hour later, which means the average amplitude Av comes to be 50 dB, and the number of AE waveform signals S having an amplitude of 80 dB comes to be the maximum five hours later, which means the average amplitude Av comes to be 80 dB.

By referring to FIG. 5A, not remarkably changing until four hours has passed since the start, the average amplitude Av starts remarkably increasing after four hours has passed and it can be understood that the average amplitude starts to reflect the development of degradation. The case of FIGS. 5A-5C demonstrate a state where a bearing of the measuring target results in being damaged in a short time, and the manner of deviation of the numeric parameter of this experiment can be considered to reflect a state of developing the successive damage of an actual mechanical element (e.g., main shaft bearing of wind turbine generator). The experiment shown in FIGS. 5A-5C relates to the same kind of damage as the damage shown in FIG. 3A that the bearing of the measuring target and inspection target is damaged in a short time. Accordingly, point of inflection of the numeric parameter as the passage of time is not detected in this case, but a point of inflection the same as that of FIG. 3B appears when the operation time is prolonged.

As detailed above, in regard of the amplitude of an AE waveform signal S, the numeric parameter can be generated also by an average amplitude Av in a unit time as well as the maximum amplitude Amax. This numeric parameter can be used as a numeric parameter for switching the measuring mode from the AE method to the vibration method.

Figure 6A:
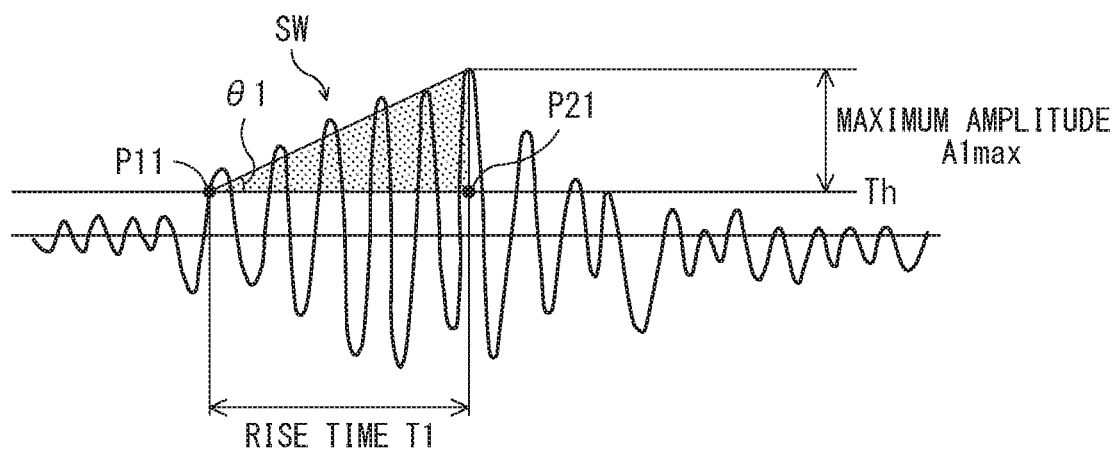
FIGS. 6A and 6B are diagram showing a particular AE vibration waveform explaining a reference value serving as fundamental of an example of a numeric parameter of the above embodiment, FIG. 6A being a waveform diagram when degradation caused by wear is being detected, FIG. 6B being a waveform diagram when degradation caused by a crack is being detected.
Figure 6B:
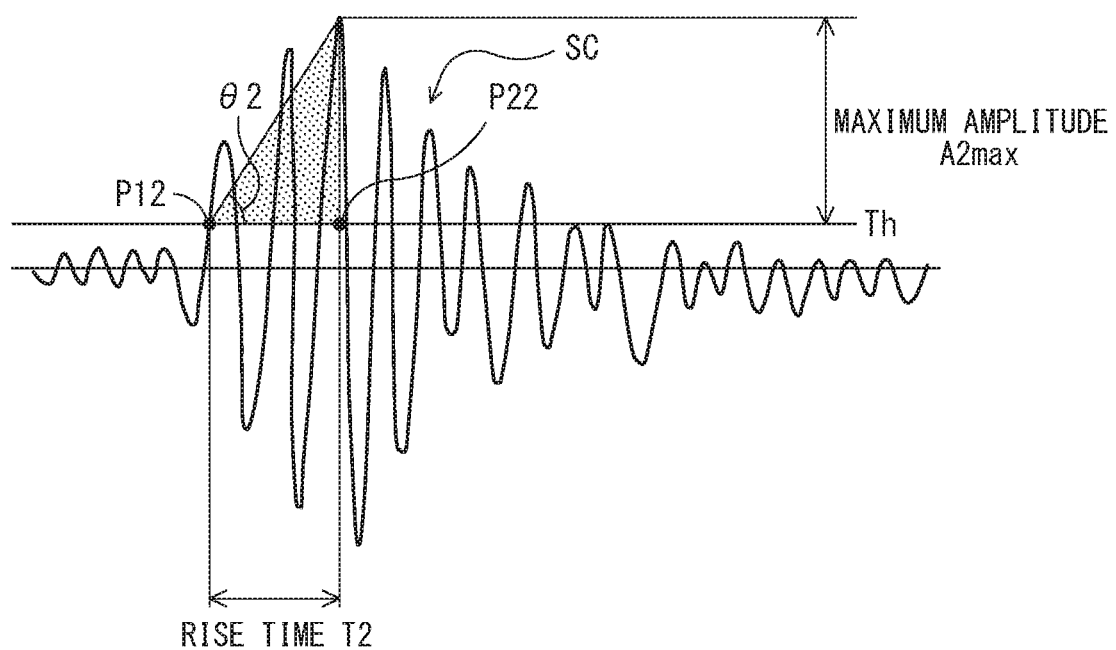

2) Numeric Parameter Based on an Inclination Angle θ:

FIG. 6A is a waveform diagram of a particular AE waveform signal occurring when wear is the dominant degradation; and FIG. 6B is a waveform diagram of a particular AE waveform signal occurring when a crack is the dominant degradation. As shown in FIGS. 6A and 6B, in regard of the AE waveform signals SW and SC, the reference values are defined as fractions having denominators representing rise times T1, T2 between the time points P11, P12 that the signals reach predetermined threshold Th for the first time and the time points P21, P22 that give the maximum amplitudes A1max, A2max, and having numerators representing the maximum amplitudes A1max, A2max corresponding to the amplitudes of the AE waveform signals at the time points P21, P22, respectively, and the number of AE waveform signals each having an inclination angle (dB/sec, the same unit applied to the inclination angles below) matching either reference value in a unit time can be regarded as a numeric parameter. This is because development of degradation of a bearing basically accompanies increase an average amplitude Av in a unit time and also when the measuring time is prolonged, the average amplitude Av decreases because of passing through points of inflection.

Here, the above reference values are parameters equivalent to angles (dB/sec, the same unit is applied to angles below) formed by the base and the hypotenuse of right triangles having the rise times T1, T2 as the bases and the maximum amplitudes A1max, A2max as the heights. For the above, the reference values are referred to reference inclination angles θ (dB/sec, the same unit applied to the inclination angles below), and a method that uses a reference inclination angle θ for generating a numeric parameter is referred to as an inclination method.

Focusing on the reference inclination angles θ as the above, Inventors have found that the type of degradation, i.e., whether the gradation is wear or crack, can be specified on the basis of the reference inclination angles θ. Here, regarding that the value of reference inclination angles θ representing wear as a second reference inclination angle (second reference value) θ1, and the value of reference inclination angles θ representing a crack as a first reference inclination angle (first reference value) θ2, an angle in a predetermined range close to 0.03 (dB/sec) can be selected as the second reference inclination angle θ1 used to detect degradation in which wear is dominant, and an angle in a predetermined range close to 0.2 (dB/sec) can be selected as the first reference inclination angle θ2 used to detect degradation in which a crack is dominant. For a bearing, these reference inclination angles θ1, θ2 vary with various factors such as contact pressure and material, but seem to always establish the relationship θ1<θ2. The ranges of the inclination angles θ1, θ2 optimum for the diagnosis can be detected by using various pieces of data related to a machine element specified to be a measuring target. Therefore, using the inclination angles separately detected, a determination can be made as to whether the degradation is degradation in which wear is dominant or degradation in which a crack is dominant along with the point of inflection.

Further in detail, detection of the number of AE waveform signals S each forming an inclination angle matching the reference angle θ1, θ2 in a unit time from the result of the detection of the AE sensor 1 can detect a point of inflection at which the numeric parameter turns from increasing to decreasing in the following manner.

2-1) The total of the number of AE waveform signals S each forming the first reference inclination angle θ2 and the number of AE waveform signals S that forms the second reference inclination angle θ1 is determined to be the numeric parameter. In this case, the numeric parameter to be detected comes to be a large number and therefore the point of inflection can be precisely detected earlier.

Since the inclination angle of an AE waveform signal S falls within one of the first reference inclination angle θ2 and the second reference inclination angle θ1, the total of the number of AE waveform signals S that forms the first reference inclination angle θ2 and the number of AE waveform signals S that forms the second reference inclination angle θ1 comes to be equivalent to the number of AE waveform signals S that occurs in a unit time. Accordingly, the number of AE waveform signals S occur in a unit time can be used as the numeric parameter.

2-2) The number of AE waveform signals S that forms the first reference inclination angle θ2 and the number of AE waveform signals S that forms the second reference inclination angle θ1 are independently from each other detected to be the numeric parameters, and the measuring mode is switched at a time point when the both or either one of the numeric parameters passes through a point of inflection. The former case can further surely detect a point of inflection. The latter case determines the preference of the numeric parameters to be used considering which one of degradation in which wear is dominant or degradation in which a crack is dominant is remarkable, and thereby can contribute to more precise detection of a point of inflection.

Furthermore, since this manner can detect independently of each other degrees of development of wear and a crack in the form of numeric data, it is possible to take measure each for the wear and the crack. Further in detail, when the number of AE waveform signals S that forms the second reference inclination angle θ1 increases in a unit time, it can be determined that wear is being developed, and maintenance such as replacement of the lubrication oil and check of the filtering portion is conducted in case of insufficient lubrication having high possibility of being the cause thereof. When the number of AE waveform signals S that forms the first reference inclination angle θ2 increases in a unit time, it can be determined that a crack is being developed and, if the machine element is a bearing, measures such as reducing the weight and lowering velocity is taken in case of fatigue fracture having a high possibility of being the cause thereof. For example, if a crack in the bearing of a wind turbine generator develops, lowering the velocity can avoid the worst circumstance where the damage of the bearing stops the wind turbine generator. A stoppage of a wind turbine generator may sometimes result in obligated payment of a large indemnity.

2-3) One of the number of AE waveform signals S that forms first reference inclination angle θ2 in a unit time and the number of AE waveform signals S that forms the second reference inclination angle θ1 in a unit time may be used as the numeric parameter. This manner is effective to a case where detection specialized for wear or that for a crack are carried out concurrently.

Figure 7:
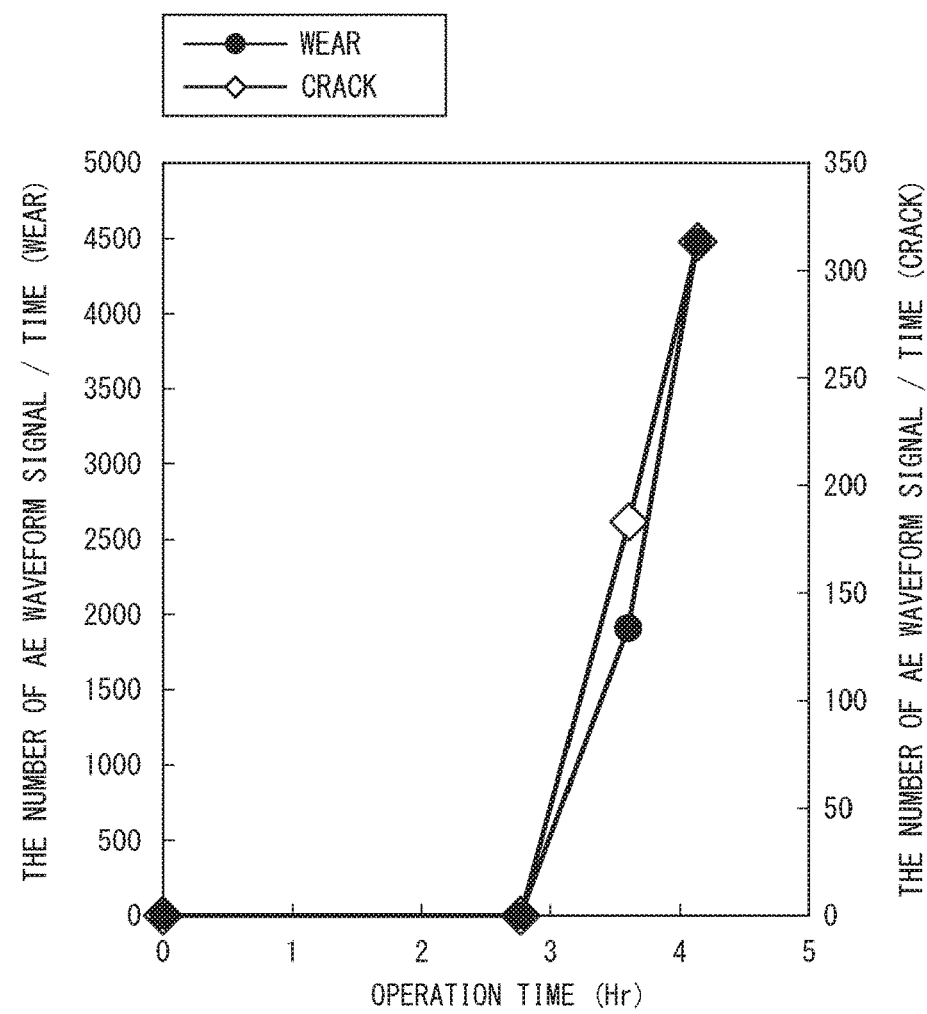
FIG. 7 is a characteristic diagram showing a result of an experiment of degradation diagnosis using an inclination angle of an AE waveform signal.

FIG. 7 is a graph showing an experimental result of degradation diagnosis in the inclination method. This experiment uses a thrust bearing and continuously operates the bearing at the contact pressure of 3.0 GPa to degrade the bearing. The experiment performs the detection the first reference inclination angle θ2 and the detection of the second reference inclination angle θ1 separately from each other. This experiment demonstrates a state where a bearing of the measuring target results in being damaged in a short time, and the manner of deviation of the numeric parameter of this experiment can be considered to reflect a state of developing the successive damage of an actual mechanical element (e.g., main shaft bearing of wind turbine generator). The experiment shown in FIG. 7 relates to the same kind of damage as the damage shown in FIG. 3A that the bearing of the measuring target and inspection target is damaged in a short time. Accordingly, a point of inflection of the numeric parameter of this case as the passage of time is not detected, but a point of inflection the same as that of FIG. 3B appears when the operation time is prolonged.

As a result of the experiment, both numeric parameters related to the reference inclination angles θ1 and θ2 abruptly increase before the operating time is reaching three hours. Furthermore, it is confirmed that the timings of the increases appear earlier than the case of FIGS. 5A-5C, which uses the amplitude of the AE waveform signals. Namely, the case of FIGS. 5A-5C abruptly increases the numeric parameter after four hours passed since the start of the experiment while the case of FIG. 7 abruptly increases the numeric parameter before three hours passed since the start of the experiment. This means that the inclination method can detect the development of degradation in this time range earlier by 20 percent than the detection based on the amplitude of an AE waveform signal irrespective of degradation being wear or a crack. The fact of the capability of detection earlier by 20% means that, assuming that actual machine is damaged at five years, the damage can be forecasted one year earlier than the actual damage. This sufficient time is largely effective to take a measure.

Since the experiment shown in FIG. 7 relates to the same kind of damage as the damage shown in FIG. 3A that the bearing of the inspection target is damaged in a short time, a point of inflection of the numeric parameter of this case as the passage of time is not detected but a point of inflection the same as that of FIG. 3B appears when the operation time is prolonged.

<Cases where Multiple AE Sensors are Installed at Multiple Positions>

Figure 8:
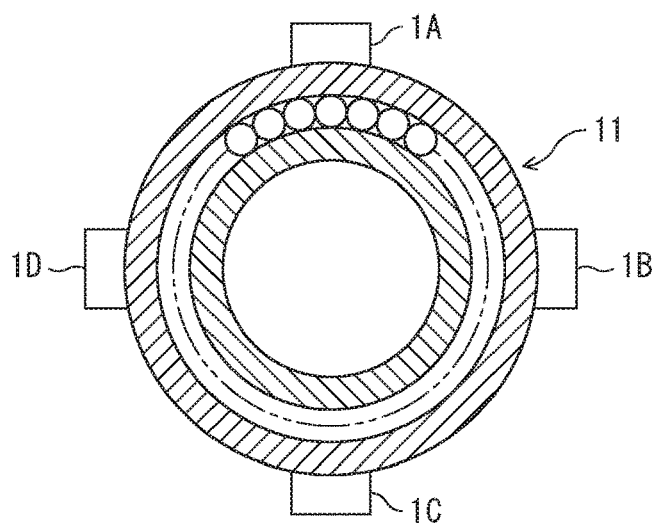
FIG. 8 is a horizontal sectional view of a bearing of a diagnosis target when AE sensors are arranged at multiple points of the bearing.

The AE sensor 1 detects elastic wave occurring from wear and a crack inside a machine element of the diagnosis target with, for example, piezoelectric element and converts the elastic wave into an AE waveform signal of an electric signal. However, due to the characteristics of the AE sensor 1 caused from an individual difference of the piezoelectric element, AE waveform signals to be output has different amplitudes. When degradation of the bearing 11 is measured as multiple points (four in the drawing) as illustrated in FIG. 8, four AE sensors 1A, 1B, 1C, and ID are used. For precise degradation diagnosis, it is required to make the sensitivities of the AE sensors 1A-1D to be uniform.

Figure 9:
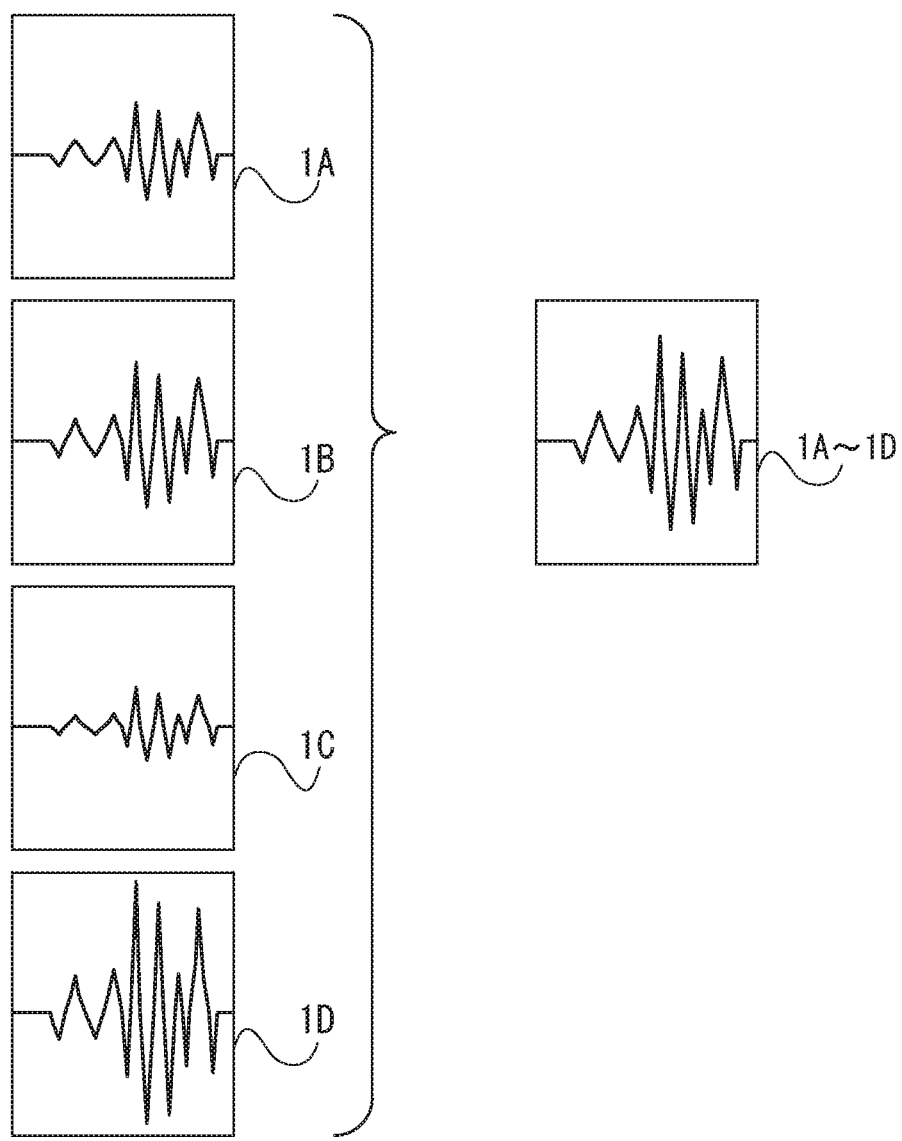
FIG. 9 is a schematic diagram showing an embodiment when sensitivities of multiple (four) AE sensors are made to be uniform.

For this purpose, the present embodiment detects a sensitive calibration amount of each of the AE sensors 1A, 1B, 1C, and 1D, which are distributed to measuring points and appropriately calibrates the sensitivity. The patterns with the reference numbers 1A, 1B, 1C, and 1D in FIG. 9 represent outputs from the AE sensors 1A, 1B, 1C, and 1D, respectively.

Specifically, the sensitive calibration amounts that make the output levels from the AE sensors 1A, 1B, 1C, and 1D uniform is obtained beforehand by providing a reference signal (a pulse signal having a predetermined voltage (e.g., 100 V)) generated by a reference signal generator o the AE sensors 1A, 1B, 1C, and 1D and then measuring the sensitivities. After that, the output levels from the AE sensors 1A, 1B, 1C, and 1D are made to be uniform by adjusting the gains of the amplifiers 4 based on the sensitive calibration amounts. As a result, the levels of the AE waveform signals of the AE sensors 1A, 1B, 1C, and 1D, which are different from one another as shown on the left side of FIG. 9, can be made to be uniform as shown on the right side of FIG. 9.

Here, the amplifier 4 and the AE signal processing system 6 shown in FIG. 1 are provided one set for each of the AE sensors 1A, 1B, 1C, and 1D. The controlling section 10 stores data related to the sensitive calibration amounts previously detected, and calibrates the amplitude of each AE waveform signal to be processed by the corresponding AE signal processing system on the basis of the sensitive calibration amount.

<Calibration of Distance Sensitivity of AE Sensors>

An AE waveform signal S generates an internal damping caused by the material and a diffuse damping proportional to a distance from degradation portion to the installing position of the AE sensor 1. The amount of damping is larger if the frequencies are high. Actual measurement on the position where a crack is generated is optimum but is impossibility, and additionally an AE waveform signal may be damped or may undergo deformation of its waveform until reaching an actual measuring position. The damping and deformation exert baneful effect to the degradation diagnosis.

Figure 10:
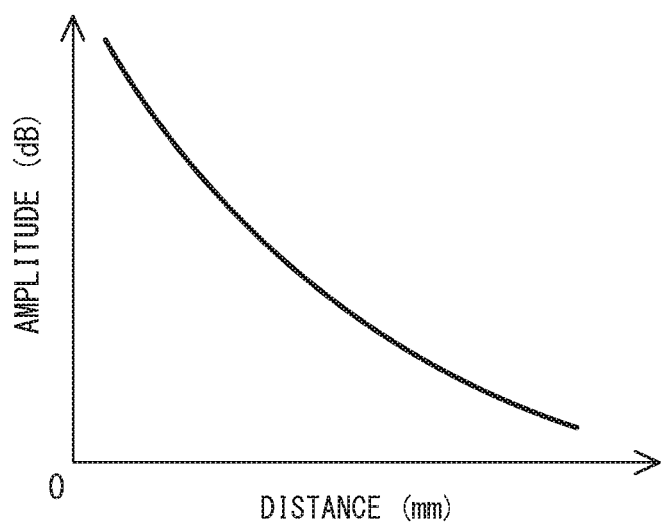
FIG. 10 is a characteristic diagram showing relationship between the sensitivity of an AE sensor and an installing position of the AE sensor.
Figure 11A:
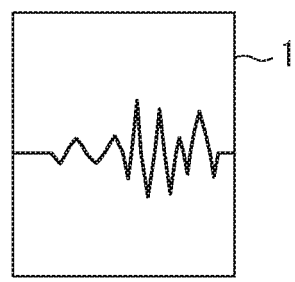
FIGS. 11A and 11B are characteristic diagrams showing an embodiment of calibrating the sensitivity when the installing position of an AE sensor is distant from a measuring position.
Figure 11B:
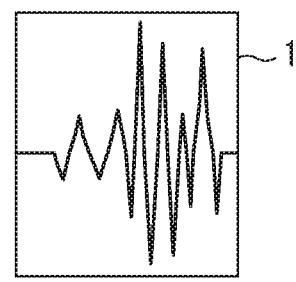

Here, the system for diagnosing performance degradation of the present embodiment shown in FIG. 1 detects a damping amount of a AE waveform signal S associated with a distance between the optimum measuring position for a change of the state with the AE sensor 1 to the actual measuring point, and stores data representing amplitude characteristic of FIG. 10 with respect to the distance generated on the basis of the result of the detection in the memory of the controlling section 10 beforehand. As shown in FIG. 11, the controlling section 10 adjusts the gain of the amplifier 4 in accordance with the distance of the optimum measuring position to the AE sensor 1 on the basis of the data of the amplitude characteristic stored in the memory. As a consequence, if the measuring position is distant from the installing position of the AE sensor 1, which detects an AE waveform signal, due to a constraint such as the presence of an obstacle, the AE sensor 1 can be made to be in an equivalent state of being moved to the optimum measuring position and measuring at the preferable measuring position. This means that, the low-level AE waveform signal before undergoing the adjustment as shown in FIG. 11A is calibrated to be the one having a level of an AE waveform signal obtained at the optimum measuring position as shown in FIG. 11B. As a result, highly precise measuring can be achieved.

DESCRIPTION OF REFERENCE NUMBERS 1, 1A, 1B, 1C, 1D AE sensor
2 vibration sensor
3 signal processing unit
6 AE signal processing unit
6a switching parameter generating section
7 vibration signal processing system
10 controlling section
11 bearing
S, SW, SC AE waveform signal
$\theta 2$ first reference inclination angle (first reference value)
$\theta 1$ second reference inclination angle (second reference value)
Th threshold

What is claimed is:

1. A method for diagnosing performance degradation of a machine element by detecting a state change occurring inside the machine element, the method comprising:
detecting the state change in an Acoustic Emission (AE) method using a plurality of Acoustic Emission (AE) waveform signals, chronologically occurring and each representing an elastic wave generated inside the machine element; and
after a predetermined numeric parameter based on the plurality of AE waveform signals turns from increasing to decreasing as time passes,
switching a measuring mode to detect the state change to a vibration method using an acceleration signal based on vibration occurring inside the machine element.

2. The method for diagnosing performance degradation of a machine element according to claim 1, wherein the numeric parameter is based on an average amplitude of the plurality of AE waveform signals occurring in a unit time.

3. The method for diagnosing performance degradation of a machine element according to claim 1, wherein:
the numeric parameter is the number of the plurality of AE waveform signals each forming an inclination angle coinciding with a reference value in a unit time; and
the inclination angle is based on a fraction having a denominator representing a rise time between a time point when each of the plurality of AE waveform signals reaches a predetermined threshold and a time point when the each AE waveform signal gives a maximum amplitude value and a numerator representing a maximum amplitude being an amplitude of the each AE waveform signal at the time point when the each AE waveform signal gives the maximum amplitude value.

4. The method for diagnosing performance degradation of a machine element according to claim 3, wherein
the reference value includes a first reference value reflecting a crack of the machine element and a second reference value reflecting wear of the machine element and being smaller than the first reference value;
the method further comprising
detecting the number of the AE waveform signals each forming the inclination angle coinciding with the first reference value in the unit time and the number of the AE waveform signals each forming the inclination angle coinciding with the second reference value in the unit time, and
using one of the number of the AE waveform signals that form the inclination angle coinciding with the first reference value and the number of the AE waveform signals each forming the inclination angle coinciding with the second reference value as the numeric parameter to switch the measuring mode.

5. The method for diagnosing performance degradation of a machine element according to claim 3, wherein
the reference value includes a first reference value reflecting a crack of the machine element and a second reference value reflecting wear of the machine element and being smaller than the first reference value;
the method further comprising
detecting a total number of the number of the AE waveform signals each forming the inclination angle coinciding with the first reference value in the unit time and the number of the AE waveform signals each forming the inclination angle coinciding with the second reference value in the unit time, and
using the total number as the numeric parameter to switch the measuring mode.

6. The method for diagnosing performance degradation of a machine element according to claim 1, wherein the numeric parameter is the number of the plurality of AE waveform signals occurring in a unit time.

7. The method for diagnosing performance degradation of a machine element according to claim 1, further comprising:
when the detecting of the state change measures a plurality of the state changes of a plurality of measuring points of the machine element using a plurality of Acoustic Emission (AE) sensors,
generating a reference signal from a reference signal generator;
previously detecting a sensitive calibration amount that adjusts the reference signal detected by each of the plurality of AE sensors to have a same amplitude; and
calibrating the plurality of AE waveform signals measured by the AE sensor using the sensitive calibration amount.

8. The method for diagnosing performance degradation of a machine element according to claim 7, further comprising:
when an installing position of each of the plurality of AE sensors is distant from an optimum measuring position for measuring the state change,
obtaining a damping amount of each of the plurality of AE waveform signals associated with a distance between the optimum measuring position and the installing position, wherein the damping amount is based on an amplitude characteristic representing an amplitude of the each AE waveform signal with respect to the distance from the optimum measuring position of the AE sensor, and
calibrating the each AE waveform signal actually measured with the damping amount.

9. A system for diagnosing performance degradation of a machine element comprising:
an Acoustic Emission (AE) sensor that is mounted on the machine element serving as a diagnosis target and that generates an Acoustic Emission (AE) waveform signal representing an elastic wave occurring inside the machine element;
a vibration sensor that is mounted on the machine element and that generates an acceleration signal based on a vibration wave occurring inside the machine element;
a signal processing unit that comprises
an Acoustic Emission (AE) signal processing system that detects a state change occurring inside the machine element in an Acoustic Emission (AE) method using a plurality of the AE waveform signals chronologically occurring by receiving the plurality of AE waveform signals and performing predetermined signal processing on the plurality of AE waveform signals,
a vibration signal processing system that detects the state change in a vibration method using the acceleration signal by receiving the acceleration signal and performing predetermined signal processing on the acceleration signal, and
a switching parameter generating section that generates a predetermined numeric parameter to switch a measuring mode from the AE method to the vibration method; and
a controlling unit that selects a result of processing in the AE method performed by the AE signal processing system at an initial stage and selects, after the numeric parameter turns from increasing to decreasing as time passes, a result of processing in the vibration method.

10. The system for diagnosing performance degradation of a machine element according to claim 9, wherein the numeric parameter generated by the switching parameter generating section is based on an average amplitude of the plurality of AE waveform signals occurring in a unit time.

11. The system for diagnosing performance degradation of a machine element according to claim 9, wherein:
the numeric parameter generated by the switching parameter generating section is the number of the plurality of AE waveform signals each forming an inclination angle coinciding with a reference value in a unit time; and
the inclination angle is a numeric value based on a fraction having a denominator representing a rise time between a time point when each of the plurality of AE waveform signals reaches a predetermined threshold and a time point when the each AE waveform signal gives a maximum amplitude value and a numerator representing a maximum amplitude being an amplitude of the each AE waveform signal at the time point when the each AE waveform signal gives the maximum amplitude value.

12. The system for diagnosing performance degradation of a machine element according to claim 11, wherein:
the reference value includes a first reference value reflecting a crack of the machine element and a second reference value reflecting wear of the machine element and being smaller than the first reference value;
the AE signal processing system
detects the number of the AE waveform signals each forming the inclination angle coinciding with the first reference value in the unit time and the number of the AE waveform signals each forming the inclination angle coinciding with the second reference value in the unit time, and
uses one of the number of the AE waveform signals each forming the inclination angle coinciding with the first reference value and the number of the AE waveform signals each forming the inclination angle coinciding with the second reference value as the numeric parameter to switch the measuring mode.

13. The system for diagnosing performance degradation of a machine element according to claim 11, wherein:
the reference value includes a first reference value reflecting a crack of the machine element and a second reference value reflecting wear of the machine element and being smaller than the first reference value;
the AE signal processing system
detects a total number of the number of the AE waveform signals each forming the inclination angle coinciding with the first reference value in the unit time and the number of the AE waveform signals each forming the inclination angle coinciding with the second reference value in the unit time, and
uses the total number as the numeric parameter to switch the measuring mode.

14. The system for diagnosing performance degradation of a machine element according to claim 9, wherein the numeric parameter is the number of the plurality of AE waveform signals occurring in a unit time.

15. The system for diagnosing performance degradation of a machine element according to claim 9, wherein:
a plurality of AE sensors is distributed to a plurality of measuring points on the machine element;
a plurality of AE signal processing systems is provided one for each of the plurality of AE sensors;
the controlling unit calibrates amplitudes of the plurality of AE waveform signals measured by the plurality of AE sensors using sensitive calibration amounts, the sensitive calibration amounts being detected previously such that amplitudes of a reference signal generated by a reference signal generator detected by the plurality of AE sensors are the same.

16. The system for diagnosing performance degradation of a machine element according to claim 9, wherein:
the controlling unit
    obtains a damping amount of each of the plurality of AE waveform signals based on an amplitude characteristic of the each AE waveform signal with respect to a distance from an optimum measuring position for measuring the state change by the AE sensor to the installing position, the amplitude characteristic being previously detected and
    calibrates an amplitude of the each AE waveform signal actually measured with the damping amount.

* * * * *